United States Patent
Yang et al.

(10) Patent No.: US 9,590,268 B2
(45) Date of Patent: Mar. 7, 2017

(54) HIGH TEMPERATURE LITHIUM CELLS WITH SOLID POLYMER ELECTROLYTES

(75) Inventors: Jin Yang, Pleasanton, CA (US); Hany Basam Eitouni, Oakland, CA (US); Mohit Singh, Berkeley, CA (US)

(73) Assignee: Seeo, Inc., Hayward, CA (US)

( * ) Notice: Subject to any disclaimer, the term of this patent is extended or adjusted under 35 U.S.C. 154(b) by 653 days.

(21) Appl. No.: 13/698,665

(22) PCT Filed: May 19, 2011

(86) PCT No.: PCT/US2011/037072
§ 371 (c)(1),
(2), (4) Date: Nov. 19, 2012

(87) PCT Pub. No.: WO2011/146670
PCT Pub. Date: Nov. 24, 2011

(65) Prior Publication Data
US 2013/0063092 A1    Mar. 14, 2013

Related U.S. Application Data

(60) Provisional application No. 61/346,409, filed on May 19, 2010.

(51) Int. Cl.
*H01M 6/04* (2006.01)
*H01M 10/0565* (2010.01)
(Continued)

(52) U.S. Cl.
CPC ..... *H01M 10/0565* (2013.01); *H01M 10/052* (2013.01); *H02J 7/00* (2013.01); *Y02E 60/122* (2013.01)

(58) Field of Classification Search
None
See application file for complete search history.

(56) References Cited

U.S. PATENT DOCUMENTS

| 5,475,054 A | 12/1995 | Abe |
| 6,274,277 B1 | 8/2001 | Mori |

(Continued)

FOREIGN PATENT DOCUMENTS

| EP | 0781795 B1 | 10/2003 |
| EP | 1553117 A1 | 7/2005 |
| WO | 01/17051 | 3/2001 |

OTHER PUBLICATIONS

Eswein, "Anionic polymerization of oxirane in the presence of the polyiminophosphazene base t-Bu-P4," Macromol. Rapid Commun., 1996, V17, p. 143.

(Continued)

*Primary Examiner* — Patrick Ryan
*Assistant Examiner* — Jose Colucci Rios
(74) *Attorney, Agent, or Firm* — R'Sue Popowich Caron

(57) ABSTRACT

Electrochemical cells that use electrolytes made from new polymer compositions based on poly(2,6-dimethyl-1,4-phenylene oxide) and other high-softening-temperature polymers are disclosed. These materials have a microphase domain structure that has an ionically-conductive phase and a phase with good mechanical strength and a high softening temperature. In one arrangement, the structural block has a softening temperature of about 210° C. These materials can be made with either homopolymers or with block copolymers. Such electrochemical cells can operate safely at higher temperatures than have been possible before, especially in lithium cells. The ionic conductivity of the electrolytes increases with increasing temperature.

19 Claims, 7 Drawing Sheets

(51) Int. Cl.
*H01M 10/052* (2010.01)
*H02J 7/00* (2006.01)

(56) References Cited

U.S. PATENT DOCUMENTS

| | | | | |
|---|---|---|---|---|
| 6,468,696 | B1* | 10/2002 | Siling | H01M 10/052 |
| | | | | 429/303 |
| 6,645,675 | B1* | 11/2003 | Munshi | H01B 1/122 |
| | | | | 252/62.2 |
| 2002/0045085 | A1* | 4/2002 | Formato | B01D 67/0088 |
| | | | | 429/535 |
| 2003/0031933 | A1 | 2/2003 | Shembel | |
| 2003/0091904 | A1* | 5/2003 | Munshi | H01M 4/131 |
| | | | | 429/309 |
| 2003/0222048 | A1 | 12/2003 | Asakawa | |
| 2005/0256256 | A1* | 11/2005 | Muramoto | C08F 290/062 |
| | | | | 524/556 |
| 2006/0000392 | A1 | 1/2006 | Reisacher et al. | |
| 2008/0045615 | A1* | 2/2008 | Best | H01B 1/122 |
| | | | | 521/27 |
| 2009/0030102 | A1 | 1/2009 | Nelles et al. | |
| 2009/0075176 | A1 | 3/2009 | Singh | |
| 2009/0103162 | A1* | 4/2009 | Burrell | B60R 1/088 |
| | | | | 359/272 |

OTHER PUBLICATIONS

Helmut Schlaad. "Synthesis of alpha, omega-Heterobifunctional Poly(ethylene glycol)s by Metal-Free Anionic Ring-Opening Polymerization," Macromolecules, 2001, V34, p. 4302.

Groenewolt, "Polyisobutylene-block-Poly(ethylene oxide) for Robust Templating of Highly Ordered Mesoporous Materials," Adv. Mater., 2005, V17, p. 1158.

Junpeng Zhao, "Amphiphilic Polystyrene-b-poly(p-hydroxystyrene-g-ethylene oxide) Block-Graft Copolymers via a Combination of Conventional and Metal-Free Anionic Polymerization," Macromolecules, 2009, V42, p. 8661.

J. F. Hester, "ATRP of Amphiphilic Graft Copolymers Based on PVDF and Their Use as Membrane Additives," Macromolecules 2002, 35, 7652-7661.

* cited by examiner

HIGH TEMPERATURE LITHIUM CELLS WITH SOLID POLYMER ELECTROLYTES

CROSS-REFERENCE TO RELATED APPLICATIONS

This application claims priority to U.S. Provisional Patent Application No. 61/346,409, filed May 19, 2010 and to International Patent Application Number PCT/US11/37072, filed May 19, 2011. This application is also related to pending U.S. patent application Ser. No. 13/698,664, filed Nov. 19, 2012. These applications are all incorporated by reference herein.

STATEMENT OF GOVERNMENT SUPPORT

The invention described and claimed herein was made in part utilizing funds supplied by the U.S. Department of Energy under Contract No. DE-OE0000223. The Government has certain rights in this invention.

BACKGROUND OF THE INVENTION

Field of the Invention

This invention relates generally to an electrochemical cell that employ solid polymer electrolytes and that can operate at high temperatures.

All publications referred to herein are incorporated by reference in their entirety for all purposes as if fully set forth herein.

The increased demand for lithium secondary batteries has resulted in research and development to improve their safety and performance. Many batteries employ liquid electrolytes and are associated with high degrees of volatility, flammability, and chemical reactivity. With this in mind, the idea of using a solid electrolyte with a lithium-based battery system has attracted great interest.

The lithium solid polymer electrolyte rechargeable battery is an especially attractive technology for Li-ion batteries because, among other benefits, the solid polymer electrolyte exhibits high thermal stability, low rates of self-discharge, stable operation over a wide range of environmental conditions, enhanced safety, flexibility in battery configuration, minimal environmental impacts, and low materials and processing costs. Moreover, solid polymer electrolytes may enable the use of lithium metal anodes, which offer higher energy densities than traditional lithium ion anodes.

Despite their many advantages, the adoption of solid polymer electrolytes has been curbed by the inability to develop an electrolyte that exhibits both high ionic conductivity and good mechanical properties. This difficulty arises because high ionic conductivity, according to standard mechanisms, calls for high polymer chain mobility. But high polymer chain mobility, according to standard mechanisms, tends to produce mechanically soft polymers.

As an example, a prototypical polymer electrolyte is one composed of polyethylene oxide (PEO)/salt mixtures. PEO generally offers good mechanical properties at room temperature. However, PEO is also largely crystalline at room temperature. The crystalline structure generally restricts chain mobility, reducing conductivity. Operating PEO electrolytes at high temperature (i.e., above the polymer's melting point) solves the conductivity problem by increasing chain mobility and hence improving ionic conductivity. However, the increased conductivity comes at a cost in terms of deterioration of the material's mechanical properties. At higher temperatures, the polymer is no longer rigid.

Block copolymers have been proposed as materials that may be able to exhibit both good mechanical properties and good conductivity. By using microphase separated block copolymers of two or more blocks, at least one block can impart mechanical integrity while at least one block can impart high conductivity. Polymer electrolytes are plagued by poor conductivity compared to liquid electrolytes. Polymer electrolytes conduct better at higher temperatures, and operating electrochemical cells at very high temperatures >110° C. results in conductivities similar to liquid electrolytes at room temperature. This must be balanced, however, against the melting temperature of the mechanical blocks. Thus far, no block copolymer has been reported that can be operated at high temperatures (>150° C.) while maintaining high mechanical strength.

Therefore, there has been and is still a strong need for a battery cell that has an electrolyte material with sufficient mechanical stability to operate at high temperatures where ionic conductivity can be optimized.

DETAILED DESCRIPTION

Figure 1:
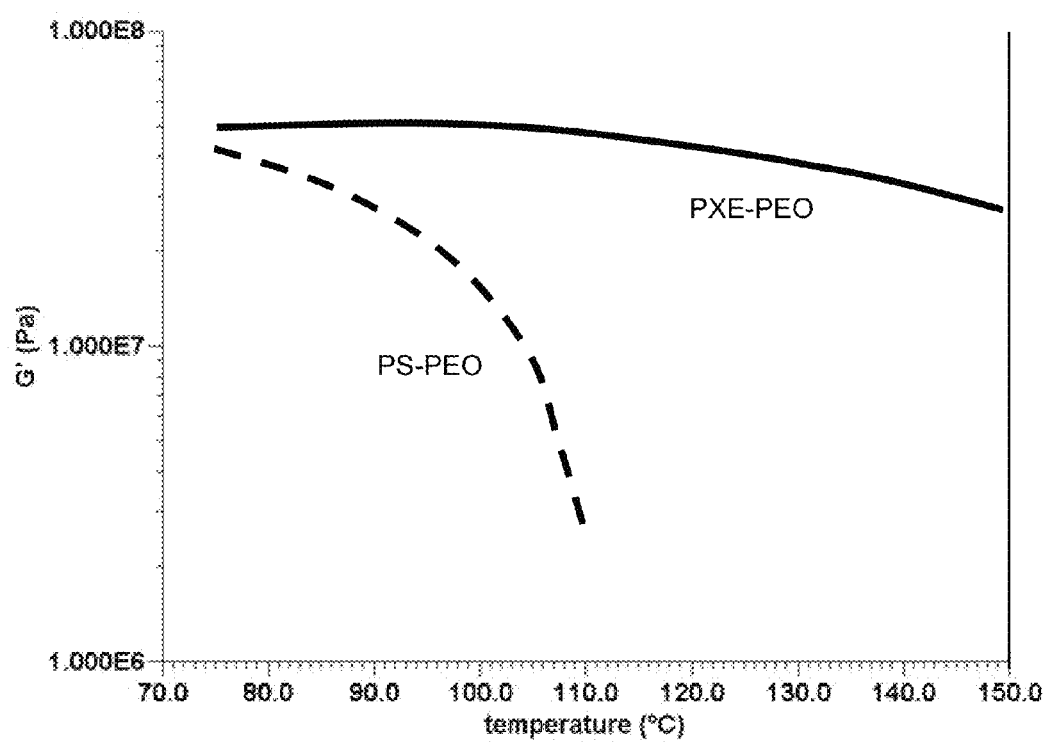
FIG. 1 shows modulus measurements for a PS-PEO block copolymer and an exemplary PXE-PEO block copolymer as a function of temperature.

Disclosed herein are electrochemical cells that employ new microphase domain polymer materials with high softening temperatures. The polymers have ionically-conductive polymer domains and structural polymer domains that have higher softening temperatures ($T_s$) than have been possible before in ionically-conductive polymers. In one embodiment of the invention, the microphase domain polymer material has domains made up of ionically-conducive homopolymers and domains made of structural homopolymers with high softening temperatures ($T_s$). The ionically-conductive polymers and the structural polymers self-order and microphase separate. In another embodiment of the invention, the microphase domain polymer material is a block copolymer that includes an ionically-conductive polymer block and a structural polymer block that has a high softening temperature ($T_s$). The microphase domain polymer materials are combined with salts (such as lithium salts) to create ionically-conductive materials that are solid at desirable high operating temperatures for use in batteries and the like.

For the purposes of this disclosure, we use the term "softening temperature ($T_s$)" to mean either glass transition temperature (for glassy polymers) or melting temperature (for crystalline polymers). In many embodiments, we discuss glassy polymers so we use the term "glass transition temperature ($T_g$)." It should be understood that for embodiments where crystalline polymers are used, the term "melting temperature ($T_m$)" can be substituted for $T_g$.

Highly conducting polymer electrolytes based on block copolymers of polystyrene (PS) and polyethylene oxide (PEO) have been disclosed previously, for example, in U.S. patent application Ser. No. 12/225,934, filed Oct. 1, 2008, U.S. patent application Ser. No. 12/2,711,828, filed Nov. 14, 2008, and International Patent Application Number PCT/US09/31356, filed Jan. 16, 2009, all of which are included by reference herein. The approximate chemical structures of these polymers are shown as (1) below, wherein m and n are the numbers of repeat units for the polystyrene and polyethylene oxide blocks, respectively.

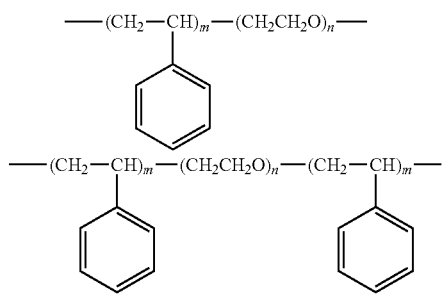

Such block copolymers have a unique lamella microphase domain morphology that results in both high modulus and relatively high ionic conductivity at 80° C. However, such polymers cannot operate at temperatures higher than about 90° C. or 100° C., where the PEO would have even higher conductivity.

Example of structural blocks that have been used in such block copolymers polymers include, but are not limited to, polystyrene, hydrogenated polystyrene, polymethacrylate, poly(methyl methacrylate), polyvinylpyridine, polyvinylcyclohexane, polypropylene, polyolefins, poly(t-butyl vinyl ether), poly(cyclohexyl methacrylate), poly(cyclohexyl vinyl ether), polyethylene, fluorocarbons, such as polyvinylidene fluoride, or copolymers that contain styrene, methacrylate, or vinylpyridine. In general these materials have softening temperatures that are no higher than about 180° C.

In general, it would be useful to have solid polymer electrolytes that can operate at temperatures where they are most conductive without losing their structural integrity. In one embodiment of the invention, a matrix of microphase separated solid polymers has both conductive phases and mechanically hard phases that can operate at high temperatures and still maintain their mechanical properties. For example, poly(2,6-dimethyl-1,4-phenylene oxide) (PXE) is a well-known thermoplastic polymer with a very high $T_g$ (210° C.). Thus ionically-conductive polymer materials in which PXE is a major component can operate at temperatures up to 210° C. without softening. Because the $T_g$ of the polymer material is higher than, for example, the melting point of lithium metal (180° C.), it can maintain its mechanical integrity even when used as an electrolyte in a lithium cell that experiences thermal runaway reaction and melting of the lithium anode. Additionally, PXE has excellent properties such as high toughness, high dimensional stability, good flame retardation and low moisture uptake that make it an ideal mechanical block for a microphase separated polymer electrolyte.

For example, block copolymers of PXE, the diblock PXE-PEO and the triblock PXE-PEO-PXE, can operate as electrolytes at elevated temperatures, resulting in higher ionic conductivity and longer cell cycling lifespan than is possible for the block copolymers shown in (1). The block polymer PXE-b-PEO has not been reported before. This is the first time that block polymer PXE-b-PEO has been synthesized using commercial available PXE and metal free anionic polymerization. In one embodiment of the invention, the structure of a PXE-PEO diblock polymer is given as (2) and the structure of a PXE-PEO-PXE triblock polymer is given as (3) below.

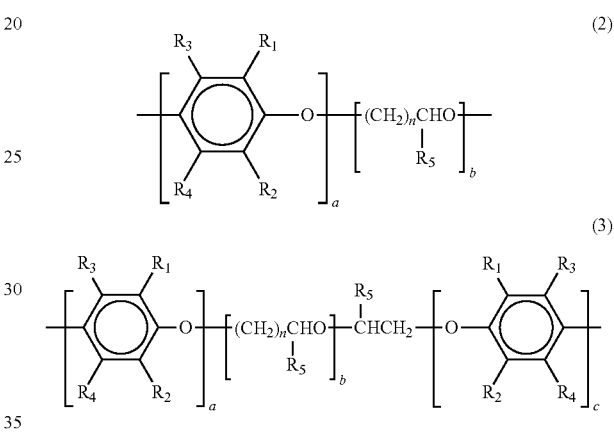

In one embodiment of the invention, each block of the linear block copolymers (2) and (3) is a linear polymer. In another embodiment of the invention, at least one of the blocks in the block copolymers (2) and (3) is not a linear polymer. In one arrangement, at least one of the blocks in the block copolymers (2) and (3) is a comb or branched polymer.

In one arrangement, a is an integer ranging from about 10 to 90, and b is an integer ranging from about 10 to 90, and c is an integer ranging from about 10 to 90. In one arrangement, $R_1$, $R_2$, $R_3$, $R_4$ can be any of hydrogen, alkyl, halogenated alkyl, alkene, aromatic rings, siloxane and alkyl with O and S ether bonds. $R_5$ can be any of hydrogen, alkyl, halogenated alkyl, alkene, an aromatic ring, siloxane and alkyl with O and S ether bonds. In one arrangement, $R_1$ and $R_2$ are hydrogen, $R_3$ and $R_4$ are $CH_3$, and $R_5$ is $CH_3O(CH_2CH_2O)_3C_3H_6Si(CH_3)_2OSi(CH_3)_2C_3H_6OCH_2$.

FIG. 1 shows modulus measurements for a PS-PEO block copolymer and an exemplary PXE-PEO block copolymer as a function of temperature. The modulus of the PS-PEO sample drops dramatically at around 100° C. while the PXE-PEO sample retains much of its rigidity even at temperatures above 150° C.

The embodiments of the invention are not limited to the examples shown in (2) and (3) above. There are a number of structural, high $T_s$ polymers that can be substituted for PXE above. There are also a number of conductive polymers that can be substituted for the PEO above. A generalized diblock structure can be shown as:

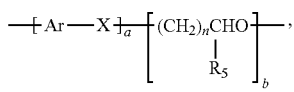

and a generalized triblock structure can be shown as:

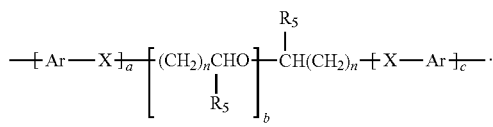

Ar can be any of:

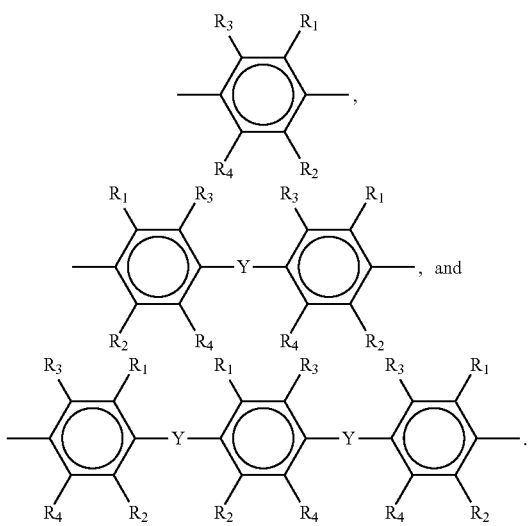

Y can be any of ketones, sulfones, isopropylidene, hexafluoroisopropylidene, amides and oxygen. R1, R2, R3, R4, and R5 can be any of hydrogen, alkyl, halogenated alkyl, alkene, aromatic rings, siloxane and alkyl with O and S ether bonds, n is an integer ranging from 1 to 10, a is an integer ranging from about 10 to 90, b is an integer ranging from about 10 to 90, and c is an integer ranging from about 10 to 90. Although these generalized structures have been shown here as block copolymers, this is not the only possibility. The conductive molecules and structural molecules can also each be homopolymers as long as they can self-assemble into a microphase domain structure.

In one embodiment of the invention, the structural polymer has a softening temperature that is no less than 190° C. In another embodiment of the invention, the structural polymer has a softening temperature that is no less than 200° C. In another embodiment of the invention, the structural polymer has a softening temperature that is no less than 210° C. In another embodiment of the invention, the structural polymer has a softening temperature that is no less than 220° C.

In one embodiment of the invention, the structural phase can be made of polymers with high softening temperatures. In one embodiment of the invention, the structural phase can be made of poly(phenylene oxide). In one embodiment of the invention, the structural phase can be made of poly(2, 6-dimethyl-1,4-phenylene oxide) (PXE). In one embodiment of the invention, the structural phase can be made of poly(phenylene sulfide). In one embodiment of the invention, the structural phase can be made of poly(phenylene sulfide sulfone). In one embodiment of the invention, the structural phase can be made of poly(phenylene sulfide ketone). In one embodiment of the invention, the structural phase can be made of poly(phenylene sulfide amide). In one embodiment of the invention, the structural phase can be made of polysulfone. In general, the softening temperatures of the microphase domain polymers disclosed herein are the same as the softening temperatures of their highest $T_s$ major component. The major components of the microphase domain polymers disclosed herein are the ionically-conductive polymer and structural polymer.

Softening Temperatures for Some Exemplary High $T_s$ Polymers

| Polymer | $T_s$ (° C.) |
|---|---|
| poly(phenylene oxide) | 210 |
| poly(2,6-dimethyl-1,4-phenylene oxide) (PXE) | 210 |
| poly(phenylene sulfide) | 218 |
| poly(phenylene sulfide sulfone) | 217 |
| poly(phenylene sulfide ketone) | 218 |
| polysulfone | 185 |

In one embodiment of the invention, the conductive phase can be made of a linear or branched polymer. Conductive linear or branched polymers that can be used in the conductive phase include, but are not limited to, polyethers, polyamines, polyimides, polyamides, alkyl carbonates, polynitriles, and combinations thereof. The conductive linear or branched polymers can also be used in combination with polysiloxanes, polyphosphazines, polyolefins, and/or polydienes to form the conductive phase.

In another exemplary embodiment, the conductive phase is made of comb (or branched) polymers that have a backbone and pendant groups. Backbones that can be used in these polymers include, but are not limited to, polysiloxanes, polyphosphazines, polyethers, polydienes, polyolefins, polyacrylates, polymethacrylates, and combinations thereof. Pendants that can be used include, but are not limited to, oligoethers, substituted oligoethers, nitrile groups, sulfones, thiols, polyethers, polyamines, polyimides, polyamides, alkyl carbonates, polynitriles, other polar groups, and combinations thereof.

Figure 2A:
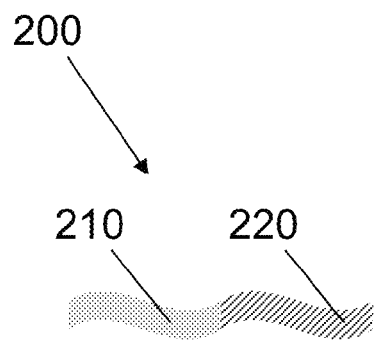
FIG. 2 is a schematic drawing of a diblock copolymer and a domain structure it can form, according to an embodiment of the invention.

FIG. 2A is a simplified illustration of an exemplary diblock polymer molecule 200 that has a first polymer block 210 and a second polymer block 220 covalently bonded together. In one arrangement both the first polymer block 210 and the second polymer block 220 are linear polymer blocks. In another arrangement, either one or both polymer blocks 210, 220 has a comb (or branched) structure. In one arrangement, neither polymer block is cross-linked. In another arrangement, one polymer block is cross-linked. In yet another arrangement, both polymer blocks are cross-linked.

Figure 2B:
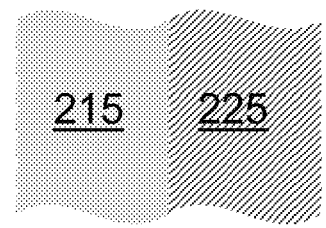
Figure 2C:
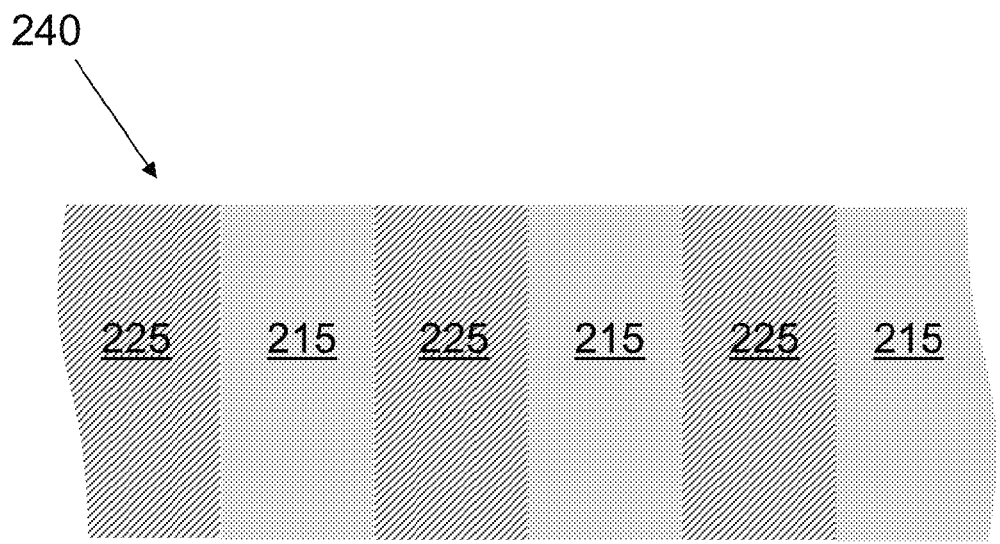

Multiple diblock polymer molecules 200 can arrange themselves to form a first domain 215 of a first phase made of the first polymer blocks 210 and a second domain 225 of a second phase made of the second polymer blocks 220, as shown in FIG. 2B. Diblock polymer molecules 200 can arrange themselves to form multiple repeat domains, thereby forming a continuous nanostructured block copolymer material 240, as shown in FIG. 2C. The sizes or widths of the domains can be adjusted by adjusting the molecular weights of each of the polymer blocks.

In another arrangement, the domains 215, 225 can be made by two different homopolymers (not shown) that form microphase-separated structures. The homopolymers may or may not be bonded together as block copolymers.

In one arrangement the first polymer domain 215 is ionically-conductive, and the second polymer domain 225 provides mechanical strength to the material.

Figure 3A:
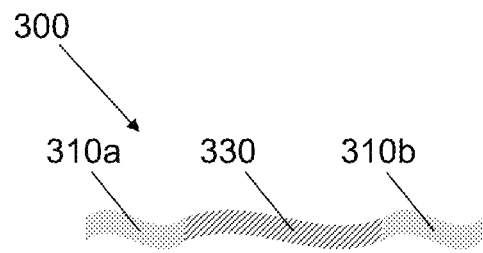
FIG. 3 is a schematic drawing of a triblock copolymer and a domain structure it can form, according to an embodiment of the invention.

FIG. 3A is a simplified illustration of an exemplary triblock polymer molecule 300 that has a first polymer block 310a, a second polymer block 320, and a third polymer block 310b that is the same as the first polymer block 310a, all covalently bonded together. In one arrangement the first polymer block 310a, the second polymer block 320, and the third copolymer block 310b are linear polymer blocks. In another arrangement, either some or all polymer blocks 310a, 320, 310b have a comb (or branched) structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 3B:
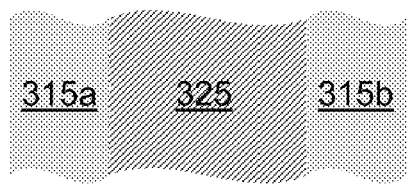
Figure 3C:
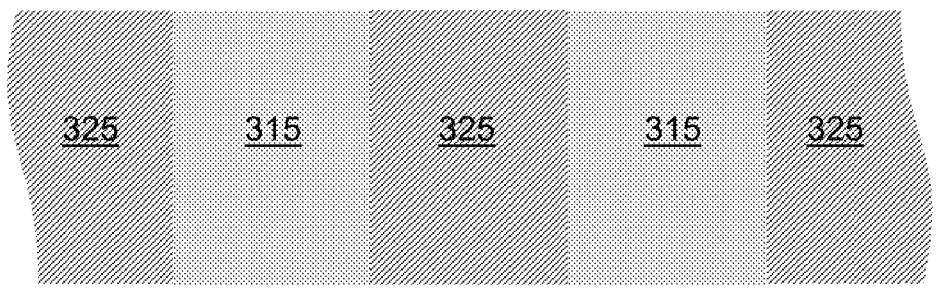

Multiple triblock polymer molecules 300 can arrange themselves to form a first domain 315 of a first phase made of the first polymer blocks 310a, a second domain 325 of a second phase made of the second polymer blocks 320, and a third domain 315b of a first phase made of the third polymer blocks 310b as shown in FIG. 3B. Triblock polymer molecules 300 can arrange themselves to form multiple repeat domains 325, 315 (containing both 315a and 315b), thereby forming a continuous nanostructured block copolymer 330, as shown in FIG. 3C. The sizes of the domains can be adjusted by adjusting the molecular weights of each of the polymer blocks.

In another arrangement, the domains 315, 325 can be made by two different homopolymers (not shown) that form microphase-separated structures. The homopolymers may or may not be bonded together as block copolymers.

In one arrangement the first and third polymer domains 315a, 315b are ionically-conductive, and the second polymer domain 325 provides mechanical strength to the nanostructured block copolymer. In another arrangement, the second polymer domain 325 is ionically-conductive, and the first and third polymer domains 315 provide a structural framework.

Figure 4A:
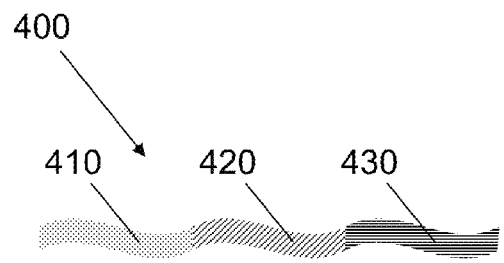
FIG. 4 is a schematic drawing of a triblock copolymer and a domain structure it can form, according to another embodiment of the invention.

FIG. 4A is a simplified illustration of another exemplary triblock polymer molecule 400 that has a first polymer block 410, a second polymer block 420, and a third polymer block 430, different from either of the other two polymer blocks, all covalently bonded together. In one arrangement the first polymer block 410, the second polymer block 420, and the third copolymer block 430 are linear polymer blocks. In another arrangement, either some or all polymer blocks 410, 420, 430 have a comb (or branched) structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 4B:
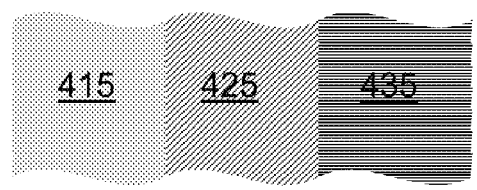
Figure 4C:
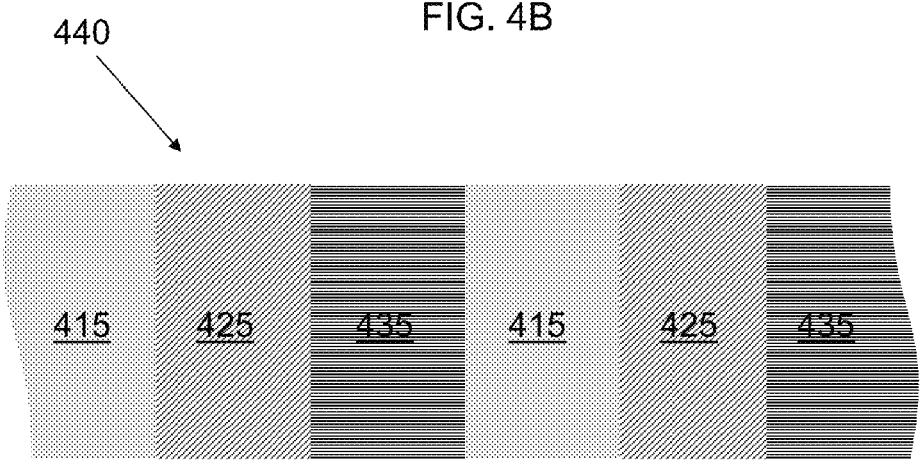

Multiple triblock polymer molecules 400 can arrange themselves to form a first domain 415 of a first phase made of the first polymer blocks 410a, a second domain 425 of a second phase made of the second polymer blocks 420, and a third domain 435 of a third phase made of the third polymer blocks 430 as shown in FIG. 4B. Triblock polymer molecules 400 can arrange themselves to form multiple repeat domains, thereby forming a continuous nanostructured block copolymer 440, as shown in FIG. 4C. The sizes of the domains can be adjusted by adjusting the molecular weights of each of the polymer blocks.

In one arrangement the first polymer domains 415 are ionically-conductive, and the second polymer domains 425 provide mechanical strength to the nanostructured block copolymer. The third polymer domains 435 provides additional functionality that may improve mechanical strength, ionic conductivity, chemical or electrochemical stability, may make the material easier to process, or may provide some other desirable property to the block copolymer. In other arrangements, the individual domains can exchange roles. In one arrangement, the third polymer domain 435 is ionically-conductive and different from the first ionically-conductive polymer block 415. In another arrangement, the third polymer domain 435 provides mechanical strength and is different from the second polymer domain 425.

In another arrangement, the domains 415, 425, 435 can be made by three different homopolymers (not shown) that form microphase-separated structures. The homopolymers may or may not be bonded together as block copolymers.

Choosing appropriate polymers for the block copolymers described above is important in order to achieve desired electrolyte properties. In one embodiment, the conductive polymer: (1) exhibits ionic conductivity of at least $10^{-5}$ Scm$^{-1}$ at electrochemical cell operating temperatures when combined with an appropriate salt(s), such as lithium salt(s); (2) is chemically stable against such salt(s); and (3) is thermally stable at electrochemical cell operating temperatures. In one embodiment, the structural material has a modulus in excess of $1\times10^5$ Pa at electrochemical cell operating temperatures. In one embodiment, the third polymer: (1) is rubbery and (2) has a glass transition temperature lower than operating and processing temperatures. In another embodiment, the third polymer: (1) exhibits ionic conductivity of at least $10^{-5}$ Scm$^{-1}$ at electrochemical cell operating temperatures when combined with an appropriate salt(s), such as lithium salt(s); (2) is chemically stable against such salt(s); and (3) is thermally stable at electrochemical cell operating temperatures. It is useful if all materials are mutually immiscible.

In one embodiment of the invention, the conductive phase can be made of a linear or branched polymer. Conductive linear or branched polymers that can be used in the conductive phase include, but are not limited to, polyethers, polyamines, polyimides, polyamides, alkyl carbonates, polynitriles, and combinations thereof. The conductive linear or branched polymers can also be used in combination with polysiloxanes, polyphosphazines, polyolefins, and/or polydienes to form the conductive phase.

In another exemplary embodiment, the conductive phase is made of comb (or branched) polymers that have a backbone and pendant groups. Backbones that can be used in these polymers include, but are not limited to, polysiloxanes, polyphosphazines, polyethers, polydienes, polyolefins, polyacrylates, polymethacrylates, and combinations thereof. Pendants that can be used include, but are not limited to, oligoethers, substituted oligoethers, nitrile groups, sulfones, thiols, polyethers, polyamines, polyimides, polyamides, alkyl carbonates, polynitriles, other polar groups, and combinations thereof.

There are no particular restrictions on the electrolyte salt that can be used in the block copolymer electrolytes. Any electrolyte salt that includes the ion identified as the most desirable charge carrier for the application can be used. It is especially useful to use electrolyte salts that have a large dissociation constant within the polymer electrolyte.

Suitable examples include alkali metal salts, such as Li salts. Examples of useful Li salts include, but are not limited to, $LiPF_6$, $LiN(CF_3SO_2)_2$, $Li(CF_3SO_2)_3C$, $LiN(SO_2CF_2CF_3)_2$, $LiB(C_2O_4)_2$, $B_{12}F_xH_{12-x}$, $B_{12}F_{12}$, and mixtures thereof.

In one embodiment of the invention, single ion conductors can be used with electrolyte salts or instead of electrolyte salts. Examples of single ion conductors include, but are not limited to sulfonamide salts, boron based salts, and sulfates groups.

In one embodiment of the invention, the structural phase can be made of polymers with high softening temperatures such as poly(phenylene oxide), poly(2,6-dimethyl-1,4-phenylene oxide) (PXE), poly(phenylene sulfide), poly(phenylene sulfide sulfone), poly(phenylene sulfide ketone), poly(phenylene sulfide amide), and polysulfone.

Additional species can be added to nanostructured block copolymer electrolytes to enhance the ionic conductivity, to enhance the mechanical properties, or to enhance any other properties that may be desirable.

The ionic conductivity of nanostructured block copolymer electrolyte materials can be improved by including one or more additives in the ionically-conductive phase. An additive can improve ionic conductivity by lowering the degree of crystallinity, lowering the melting temperature, lowering the glass transition temperature, increasing chain mobility, or any combination of these. A high dielectric additive can aid dissociation of the salt, increasing the number of Li+ ions available for ion transport, and reducing the bulky Li+[salt] complexes. Additives that weaken the interaction between Li+ and PEO chains/anions, thereby making it easier for Li+ ions to diffuse, may be included in the conductive phase. The additives that enhance ionic conductivity can be broadly classified in the following categories: low molecular weight conductive polymers, ceramic particles, room temp ionic liquids (RTILs), high dielectric organic plasticizers, and Lewis acids.

Other additives can be used in the polymer electrolytes described herein. For example, additives that help with overcharge protection, provide stable SEI (solid electrolyte interface) layers, and/or improve electrochemical stability can be used. Such additives are well known to people with ordinary skill in the art. Additives that make the polymers easier to process, such as plasticizers, can also be used.

Further details about block copolymer electrolytes are described in U.S. patent application Ser. No. 12/225,934, filed Oct. 1, 2008, U.S. patent application Ser. No. 12/2,711,828, filed Nov. 14, 2008, and International Patent Application Number PCT/US09/31356, filed Jan. 16, 2009, all of which are included by reference herein.

Polymer electrolytes with high ionic conductivity are important for applications such as solid-state batteries. The performance of these materials depends not only on their electrical properties but also on other properties such as shear modulus, permeability, and the like. The mechanical properties of polymer electrolytes are particularly important in secondary solid-state lithium (Li) batteries. One of the challenges in the field of rechargeable Li-ion batteries is to combine high energy density with good cyclability and electrode stability. Batteries that employ Li metal anodes for high energy density applications suffer from failures due to side reactions and dendrite growth on the Li electrodes. Repeated cycling of the batteries leads to roughening of the Li surface and eventually to formation and growth of dendrites, which reduce battery life and compromise safety.

Figure 5:
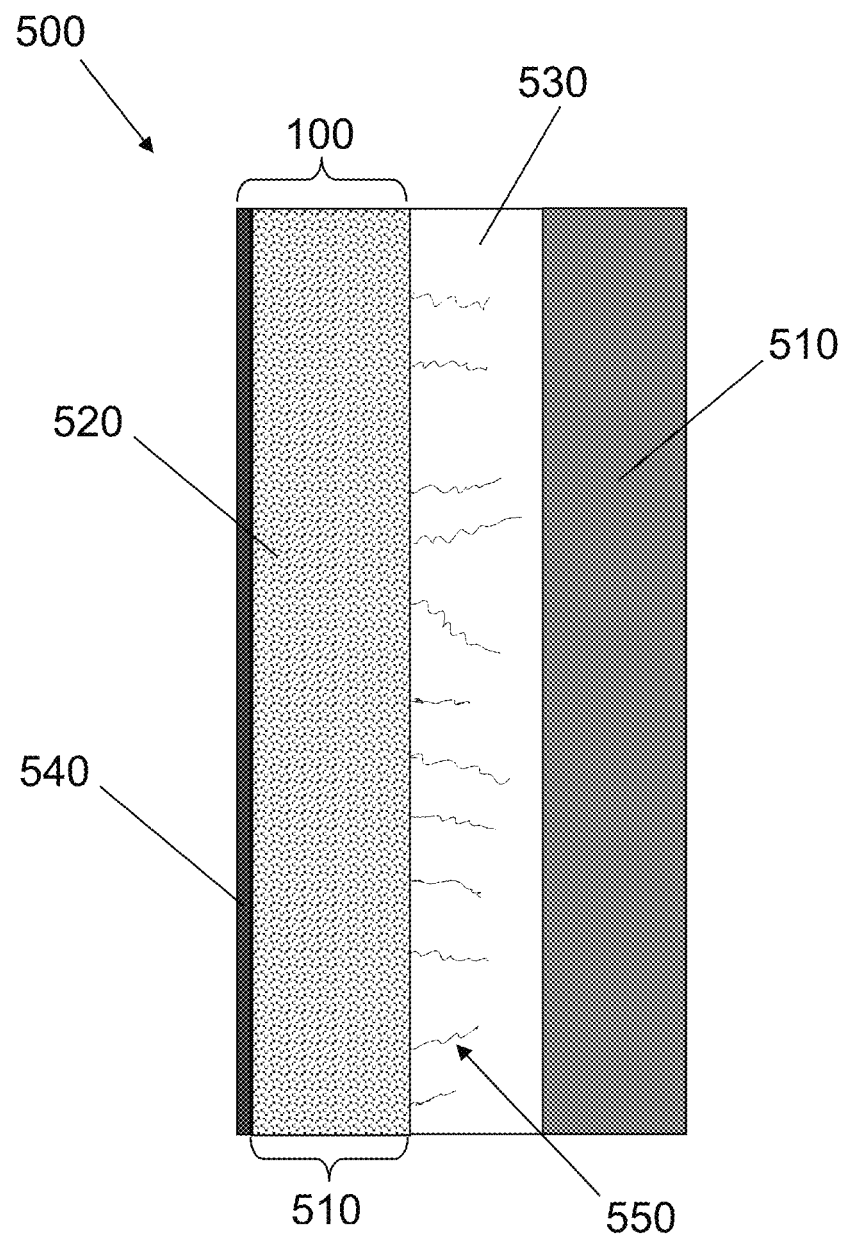
FIG. 5 shows an electrochemical cell that has formed dendrites extending out from the anode.

As shown in FIG. 5, an exemplary electrochemical cell 500 has a positive electrode (cathode) 510, a negative electrode (anode) 520, and a polymer electrolyte 530 positioned between the cathode 510 and the anode 520. In one arrangement, when the cathode 510 is a composite material, the same or a different polymer electrolyte is also used within the cathode 510. In one arrangement, the anode is lithium metal or alloy. After the cell 500 has been cycled many times Li metal or alloy dendrites 550 can form and begin growing out from the anode 520. As the dendrites 550 continue to grow, they can reach the cathode 510 and short circuit the cell 500, causing catastrophic failure.

Studies indicate that dendrite growth on the anode surface can be prevented by introducing a highly rigid electrolyte (elastic modulus of about 1 GPa) against the anode. This high modulus requirement essentially renders most rubbery polymer electrolytes incompatible with the electrode material, as the elastic moduli of typical rubbery polymers are about 1 MPa. For example, polyethyleneoxide (PEO) melt, one of the most studied polymer electrolytes, has an elastic modulus of less than 1 MPa. High ionic conductivity is obtained in soft polymers such as PEO because rapid segmental motion needed for ion transport also decreases the rigidity of the polymer. Glassy polymers such as polystyrene offer very high moduli (about 3 GPa) but are poor ion conductors. These materials have been combined as block copolymers (e.g., PS-PEO) to make electrolytes of the type shown in (1) above, providing both ionic conductivity and high modulus.

Figure 6:
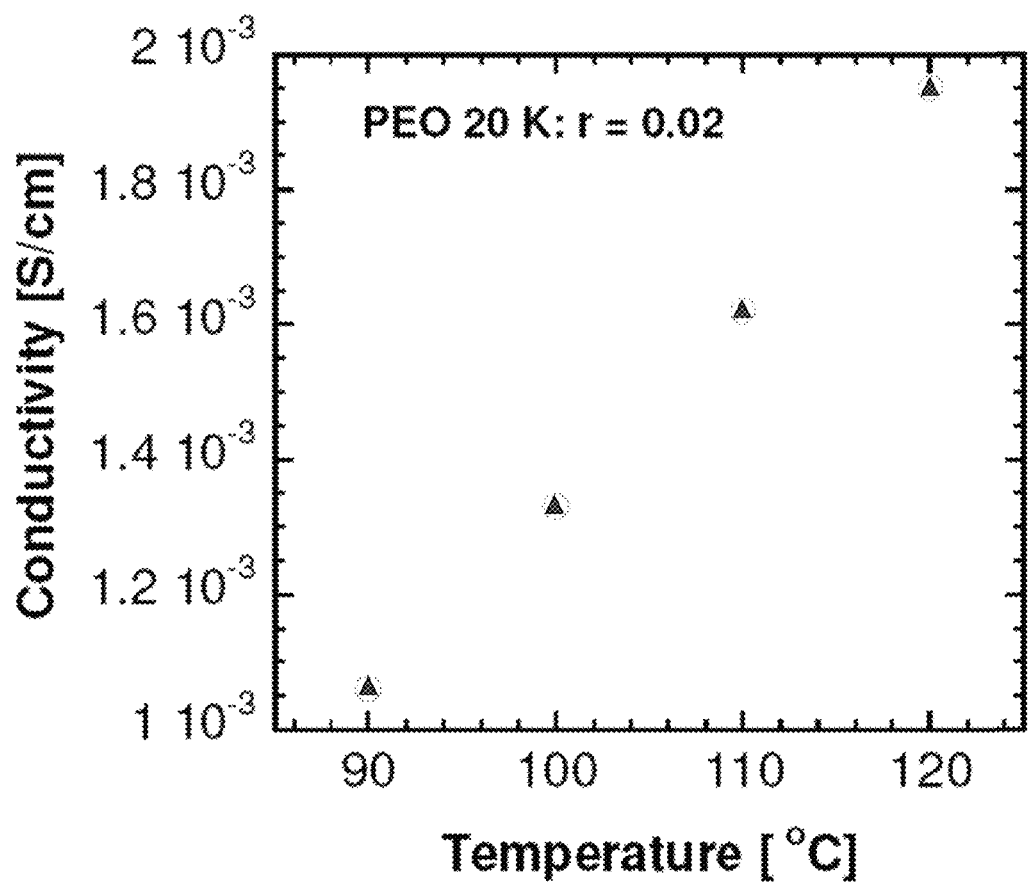
FIG. 6 is a plot of ionic conductivity as a function of temperature, showing that conductivity increases with increasing temperature.

FIG. 6 is a plot that shows how the ionic conductivity of PEO increases as a function of temperature in a range from 90-120° C. In general, ionically-conductive polymers, as discussed above, show increased conductivity with temperature. Clearly, it would be advantageous to operate an electrochemical cell that contains such an ionically-conductive polymer at the highest temperature possible in order to get the best ionic conductivity possible. Of course, as discussed above, there is also safety to consider when choosing an operating temperature. Polystyrene has a $T_g$ of 95° C., as does the PS-PEO block copolymer of which it is the structural component. It is important to note that $T_g$ is a second order transition (broad, not abrupt) and the PS-PEO, despite having a $T_g$ of 95° C., is already starting to suffer a reduction in modulus at 80° C. Experiments have shown that in an electrochemical cell dendrites can begin to grow into a PS-PEO block copolymer electrolyte at temperatures as low as 100° C. At 100° C., the PS component has softened and the overall mechanical properties of PS-PEO are essentially equivalent to the mechanical properties of PEO alone.

On the other hand, PXE has a significantly higher $T_g$ at 210° C. Thus temperatures around 100° C. are too low to cause softening of PXE. Experiments have shown that no dendrites are formed in electrochemical cells operated 100° C. with repeated cycling which employ PXE-PEO electrolytes. An electrochemical cell that employs PXE-PEO electrolytes can be operated at even higher temperatures without reduction of modulus.

There are many factors to determine the optimum temperature at which to operate an electrochemical cell. Ionic conductivity increases with temperature, but mechanical integrity of the electrolyte decreases with temperature. In addition, it is desirable to avoid melting of a lithium metal or alloy anode. Furthermore, even with careful temperature control, there can be local fluctuations, so it is important when choosing an operating temperature to build in a margin of safety to avoid lifetime reduction and/or catastrophic failure. Clearly, there are advantages in using solid polymer electrolytes based on PXE-PEO, as described herein, instead of PS-PEO materials. The PXE-PEO system makes it possible to operate at higher temperatures, thus increasing ionic conductivity and/or to operate at the same temperatures with a greater margin of safety.

In one embodiment of the invention, an electrochemical cell (such as that shown in FIG. 5, but without the dendrites 550) a solid polymer electrolyte 530 has a softening temperature ($T_s$) that is higher than the $T_s$ of either the cathode 510 or the anode 520. In one embodiment of the invention, the solid polymer electrolyte 530 is a microphase-domain PXE-PEO polymer. In another embodiment of the invention, the anode 520 has a melting point no higher than 180° C. and the solid polymer electrolyte 530 has a $T_s$ that is higher than 180° C. In one arrangement, the solid polymer electrolyte 530 has a $T_s$ of more than 190° C. In another arrangement, the solid polymer electrolyte 530 has a $T_s$ of more than 200° C. In another arrangement, the solid polymer electrolyte 530 has a $T_s$ of more than 210° C.

Clearly, it is prudent to operate electrochemical cells well below the temperature at which any of the components would melt. This is true especially for cells that contain lithium metal as melting and leaking of lithium can lead to explosions. In designing safety into a cell, it would be useful for a solid polymer electrolyte to maintain structural integrity (without softening) even if the lithium were to melt as it could help to contain the molten lithium. Electrolytes of type (1) listed above all soften at temperatures at or lower than the Li melting point (180° C.). Thus, high $T_s$ microphase-separated domain polymers, as discussed herein, are especially well-suited for ensuring an extra margin of safety when used as electrolytes in lithium cells. In one embodiment of the invention, the elastic modulus of the solid polymer electrolyte 530 is at least 1 GPa at the melting temperature of the anode.

Figure 7:
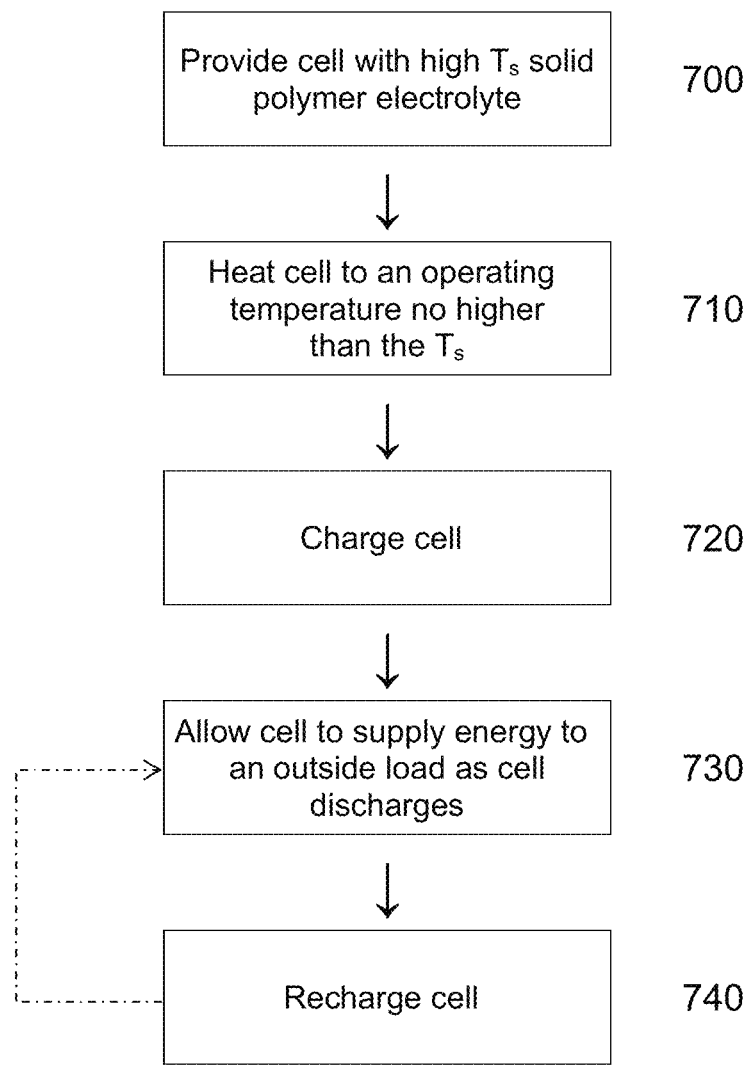
FIG. 7 is a diagram that shows the steps to be used in operating an electrochemical cell, according to an embodiment of the invention.

In another embodiment of the invention a method of operating a high-temperature electrochemical cell is provided. The steps of the method are outlined in FIG. 7. In step 700 a cell that has a high $T_s$ solid polymer electrolyte is provided. High $T_s$ electrolytes have been described in detail above. In step 710 the cell is heated to an operating temperature no higher than the $T_s$ of the electrolyte. The temperature to which the cell is heated is also below the melting point of the anode, especially if the anode is a lithium metal or lithium alloy thin layer. In one arrangement, the operating temperature is as high as possible without any danger of melting the anode. One rule-of-thumb is to operate no higher than 20° C. below the melting temperature of the anode. In step 720 the cell is charged. In step 730 the cell supplies energy to an outside load as the cell discharges. In step 740 the cell is recharged so that it can be used again starting at step 730.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. An electrochemical cell, comprising:
a negative electrode;
a positive electrode;
a microphase separated solid polymer electrolyte positioned between the negative electrode and the positive electrode, the electrolyte comprising:
a first polymer phase, the first phase providing ionic conductivity; and
a second polymer phase, the second phase providing mechanical structure and the second phase having a softening temperature no less than 190° C.

2. The cell of claim 1 wherein the melting point of the negative electrode is less than the softening temperature of the second polymer phase.

3. The cell of claim 1 wherein the melting point of the negative electrode is no more than about 180° C.

4. The cell of claim 1 wherein the negative electrode comprises lithium.

5. The cell of claim 1 wherein the first phase is selected from the group consisting of polyethers, polyamines, polyimides, polyamides, alkyl carbonates, polynitriles, polysiloxanes, polyphosphazines, polyolefins, polydienes, and combinations thereof.

6. The cell of claim 1 wherein the first phase comprises comb polymers that have a backbone and pendant groups.

7. The cell of claim 6 wherein the backbones are selected from the group consisting of polysiloxanes, polyphosphazines, polyethers, polydienes, polyolefins, polyacrylates, polymethacrylates, and combinations thereof.

8. The cell of claim 7 wherein the pendants are selected from the group consisting of oligoethers, substituted oligoethers, nitrile groups, sulfones, thiols, polyethers, polyamines, polyimides, polyamides, alkyl carbonates, polynitriles, other polar groups, and combinations thereof.

9. The cell of claim 1 wherein the second phase is selected from the group consisting of [poly(phenylene oxide), poly (2,6-dimethyl-1,4-phenylene oxide) (PXE), poly(phenylene sulfide), poly(phenylene sulfide sulfone), poly(phenylene sulfide ketone), poly(phenylene sulfide amide), poly(phenylene sulfide ketone ketone), poly(ether ether ketone), polysulfone, and combinations thereof.

10. The cell of claim 1 wherein a plurality of at least two kinds of homopolymers form the first phase and the second phase, the homopolymers capable of microphase separation by self assembly.

11. The cell of claim 1 wherein a plurality of block copolymers form the first phase and the second phase.

12. The cell of claim 11 wherein the block copolymer structure comprise the following:

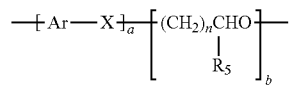

wherein Ar is selected from the group consisting of:

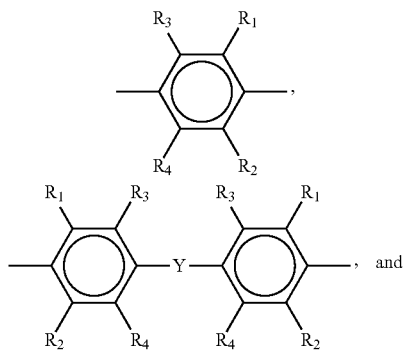

-continued

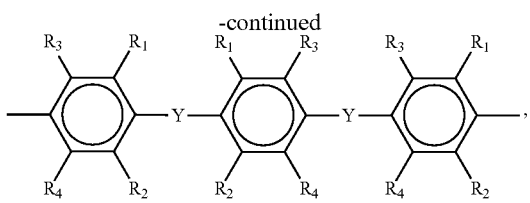

wherein:
Y is selected from the group consisting of ketones, sulfones, isopropylidene, hexafluoroisopropylidene, amides and oxygen;
$R_1$, $R_2$, $R_3$, $R_4$, and $R_5$ is each selected from the group consisting of hydrogen, alkyl, halogenated alkyl, alkene, aromatic rings, siloxane and alkyl with O and S ether bonds;
n is an integer ranging from 1 to 10;
a is an integer ranging from about 10 to 90; and
b is an integer ranging from about 10 to 90.

13. The cell of claim 12 wherein the block copolymer structure further comprises an additional group with the following structure:

the additional group attached to the polymer of claim 12 to form the following structure:

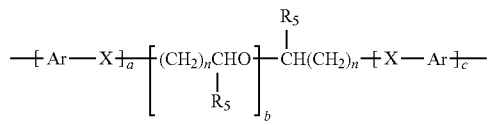

and wherein c is an integer ranging from about 10 to 90.

14. An electrochemical cell, comprising:
a negative electrode;
a positive electrode;
a solid polymer electrolyte positioned between the negative electrode and the positive electrode, the electrolyte comprising:
an association of a plurality of block copolymer chains each comprising:
at least one ionically conducting block;
at least one PXE block immiscible with the ionically conducting block;
wherein the chains are arranged in an ordered nanostructure comprising a continuous matrix of:
first domains defined by association of ionically-conductive blocks; and
second domains defined by association of PXE blocks.

15. A method of operating an electrochemical cell, comprising the steps of:
(a) providing an electrochemical cell comprising:
(i) a positive electrode;
(ii) a negative electrode comprising lithium metal; and
(iii) a microphase separated solid polymer electrolyte positioned between the negative electrode and the positive electrode, the electrolyte comprising:
1. a first polymer phase, the first phase providing ionic conductivity; and
2. a second polymer phase, the second phase having a softening temperature no less than 190° C.;
(b) heating the cell to an operating temperature;
(c) charging the cell; and
(d) allowing the cell to supply energy to an outside load as the cell discharges.

16. The method of claim 15 wherein the operating temperature is no more than 160° C.

17. The method of claim 15 wherein the operating temperature is no more than 125° C.

18. The method of claim 15 wherein the operating temperature is no more than 100° C.

19. The method of claim 15, further comprising step:
(e) recharging the cell.

* * * * *